(12) United States Patent
Revis

(10) Patent No.: US 6,704,491 B1
(45) Date of Patent: Mar. 9, 2004

(54) VIDEO REVIEW APPARATUS AND METHOD

(75) Inventor: Paul A. Revis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/492,828

(22) Filed: Jan. 27, 2000

(51) Int. Cl.⁷ ................................................ H04N 5/91
(52) U.S. Cl. ........................................ 386/94; 386/126
(58) Field of Search ............................ 386/94, 52, 46, 386/55, 125–126; H04N 5/91

(56) References Cited

U.S. PATENT DOCUMENTS

| | | |
|---|---|---|
| 5,434,678 A | 7/1995 | Abecassis |
| 5,589,945 A | 12/1996 | Abecassis |
| 5,598,276 A | 1/1997 | Cookson et al. |
| 5,634,849 A | 6/1997 | Abecassis |
| 5,664,046 A | 9/1997 | Abecassis |
| 5,691,972 A | 11/1997 | Tsuga et al. |
| 5,696,869 A | 12/1997 | Abecassis |
| 5,717,814 A | 2/1998 | Abecassis |
| 5,724,472 A | 3/1998 | Abecassis |
| 5,737,479 A | 4/1998 | Fujinami |
| 5,757,417 A | 5/1998 | Aras et al. |
| 5,828,786 A | 10/1998 | Rao et al. |
| 5,900,908 A | 5/1999 | Kirkland |
| 5,913,013 A | 6/1999 | Abecassis |
| 6,138,147 A | 10/2000 | Weaver et al. |
| 6,201,924 B1 | 3/2001 | Crane et al. |
| 6,208,805 B1 | 3/2001 | Abecassis |
| 6,289,165 B1 | 9/2001 | Abecassis |
| 6,304,715 B1 | 10/2001 | Abecassis |

OTHER PUBLICATIONS

Taylor, Jim; DVD Demystified: The Guidebook for DVD–Video and DVC–ROM; ISBN 0–07–064841–7; 1. DVD Technology; I. Title; TK78823C56T39 1997.

U.S. patent application Ser. No. 09/526,910, Fleming, III et al., filed Mar. 16, 2000.

Primary Examiner—Vincent Boccio
(74) Attorney, Agent, or Firm—Perkins Coie LLP

(57) ABSTRACT

The invention provides a method of quickly previewing user selected portions of a DVD or other stored work having a questionable rating without having to view the entire work. By utilizing the rating information contained in the scene, a scene can be called up for review and a decision can be made quickly whether or not to accept or reject that particular scene for playback during the playback of the entire work. Discrete scenes of the work may be approved or disapproved for viewing individually or collectively, and in some cases, alternative, less offensive scenes may be substituted in place of rejected scenes. These accepted scenes may be combined with other scenes, that have a rating less than that originally chosen by user, for later seamless viewing of the work.

37 Claims, 5 Drawing Sheets

VIDEO REVIEW APPARATUS AND METHOD

BACKGROUND OF THE INVENTION

1. Field of the Invention

The present invention relates generally to the field of controlled playback of audiovisual works based on program content and viewer preference.

2. Description of the Related Art

Movies and videos currently have a content "rating" which is used to control access to the work by minors. The movie ratings system in the United States has been determined by producers (distributors, dealers) voluntarily. According to the document "THE MOVIE BUSINESS BOOK, pp 396–406, 'THE VOLUNTARY MOVIE RATING SYSTEM'", the ratings are broken down into five categories of:

- "G", General Audiences—All ages admitted;
- "PG", Parental Guidance Suggested—Some material may not be suitable for children;
- "PG-13", Parents strongly cautioned—Some material may be inappropriate for children under 13;
- "R", Restricted, under 17—Requires accompanying parent or adult guardian; and
- "NC-17"—No children under 17 admitted.

Therefore, in accordance with these assignments, entrance to a movie theater is restricted and selling or renting of a video tape, may likewise be restricted. Currently, one rating level is assigned to an entire movie, and this rating level is utilized for comparison with the ages of patrons of a movie theater or buyers/renters at a video shop. However, only small portions of the work may be the cause of a particular rating (e.g., scenes which contain violence, objectionable language, adult situations, nudity, etc.). Additionally, a rating assigned by a standards body may not conform to a standard that an individual viewing or previewing the work for a younger family member would assign. Accordingly, a parent may desire to preview a work to determine what rating is appropriate for younger family members. However, completely previewing a work takes a fairly long time. Therefore, it is an unpleasant task, and in some instances, is forgone completely in favor of the pre-assigned ratings.

Currently, newer technologies such as digital video disk (DVD) allow for sanitized versions of a work to reside on the same disc as the original work. By setting a given "Parental Level," corresponding to a desired permissible ratings level, the software of the DVD player will allow a reviewer to pick and play the set level for the work. Parental levels restrict either the playback of an entire work or of certain scenes (comprised of video frames) of the work. Parental level codes are placed on the disc in each scene so that the user can automatically select the proper path from scene to scene. This allows multiple rating versions of a movie to be put on a single disc. For this to work, the video must be carefully broken down into scenes. Objectionable scenes must be coded so that they can be skipped over, or alternate versions of the scenes must be provided and appropriately coded. This does not really solve the problem, however, because a viewer is still relying on the judgment of the standard setter to define the ratings levels. If a parent wants to check the pre-assigned ratings level for a work as a whole, or for scenes of the work, a full length preview of the work is still required. Other parental ratings control systems are described in U.S. Pat. Nos. 5,905,845, 5,757,417, 5,691,972, 5,737,479, and 5,598,276.

What is needed is a way of previewing only scenes of a work which may be objectionable. By only viewing those scenes causing a negative rating, time of review can be shortened, and reviewing individuals, e.g. a parent, can more quickly and easily check the conformity of the rating by the standards body with their own priorities and values.

SUMMARY OF THE INVENTION

In one aspect of the invention, a method for controlling reproduction of a displayable work stored on a recording medium the work having at least one assigned ratings level associated with at least one scene is provided. The method further provides receiving a ratings level input, selecting all scenes of the work which have a rating level equal to a received ratings level input, displaying the selected scenes and receiving a first input command accepting or rejecting selected and displayed scenes for later viewing.

In another aspect of the invention, an apparatus for controlling reproduction of a displayable work stored on a recording medium the work having at least one assigned ratings level associated with at least one scene is provided. The apparatus further provides a reproduction device for selectively reproducing scenes from a recording medium, a display device coupled to the reproduction device for displaying the selectively reproduced scenes and a controller responsive to entry of a first ratings level for controlling the reproduction device to cause the selective reproduction and display of scenes from a recording medium having the entered ratings level and for recording an entered accept or reject command associated with the displayed scenes.

These and other features and advantages of the invention will be more clearly understood from the following detailed description of the invention which is provided in connection with the accompanying drawings.

DETAILED DESCRIPTION OF PREFERRED EMBODIMENTS

In the following description, for purposes of explanation, specific numbers, materials and configurations are set forth in order to provide a thorough understanding of the present invention. However, it will be apparent to one skilled in the art that the present invention need not be practiced exactly as described, and that many modifications, substitutions and other changes can be made without departing from the specific scope of the invention. Moreover, in the following description well known features are omitted or simplified in order not to obscure the present invention. Furthermore, for ease of understanding, certain operations are described in a particular order, however, these operations are not to be construed as necessarily order dependent in their actual performance.

Figure 1:
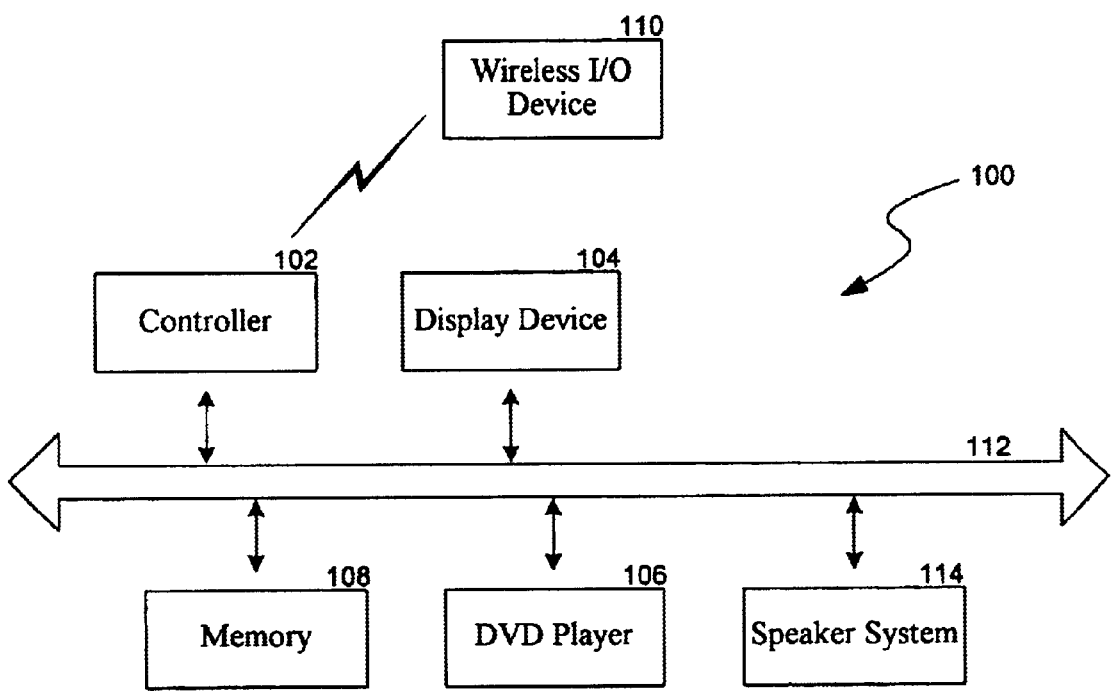
FIG. 1 illustrates a block diagram of an apparatus for reviewing a work constructed in accordance with the present invention.

Referring now to the drawings, where like reference numerals designate like elements, FIG. 1 illustrates in block diagram form the components of one exemplary review apparatus 100 constructed according to the present invention. Review apparatus 100 includes a controller 102, display device 104, digital video disk or digital versatile disk (DVD) player 106, memory device 108 and speaker system 114, all coupled to input/output (I/O) bus 112. At the core of the review apparatus is controller 102, which may be a programmable logic device such as a microprocessor, digital signal processor, programmable logic array or other programmable device. Controller 102 is configured to control a wide variety of features associated with each of the illustrated components. As depicted, controller 102 is communicatively coupled to each of the components, as necessary, through I/O bus 112.

Controller 102 is programmed to receive an input command via wireless I/O device 110 operated by a user for selecting a particular level for appropriate content and rating. Controller 102 communicates this input command via I/O bus 112 to DVD player 106 and DVD player 106 then plays scenes that have a rating level equal to that selected by user through display device 104 for review by the user.

Controller 102 is further programmed to receive an input command via wireless I/O device 110 by a user either accepting or rejecting particular scenes under review. Those scenes that are accepted are stored in memory 108 in the form of pointers to the particular video frames which make up the scene or scenes. Controller 102 communicates via I/O bus 112 with memory 108 to create a database of pointers for the video frames, make up the accepted scene(s). After all the scenes are viewed for acceptance or rejection, controller 102 then communicates with memory 108 to compile the pointers to each of the video frames that has been accepted by user (note, the database of pointers that are compiled can be comprised of pointers to rejected scenes as well, which are not selected, for later viewing). During playback of a DVD movie, DVD player 106 directly accesses memory 108 and plays those scenes that have been accepted by user through the display device 104 and speaker system 114. This database of pointers can be stored in memory 108 for later viewing as well. Further, controller 102 is programmed to select for viewing all scenes with a rating less than the rating or level chosen by user and discard for viewing all scenes with a rating or level higher than that chosen by user. For example, if a user selects a PG-13 ratings level, the work will be all the G, PG and accepted PG-13 scenes. Hence, all the scenes with a rating less than that chosen by user as well as the scenes that are chosen by user as acceptable with a rating equal to that selected by user are later played by DVD player 106, in a seamless fashion, through display device 104 and speaker system 114 by utilizing the rating associated with each of the video frames and the pointers as described above.

In one embodiment, controller 102 and memory 108 may be part of a computer system suitably programmed to carryout the invention. The system controller 102 may be one of a broad category of computer systems known in the art. An example of such a computer system is a desktop computer system equipped with a high performance microprocessor(s), such as the Pentium processor, Pentium Pro processor or Pentium II processor manufactured by and commonly available from Intel Corporation of Santa Clara, Calif. or the Alpha processor manufactured by Digital Equipment Corporation of Manard, Mass. The DVD player 106, display device 104 and speaker system 114 may be separate from the computer system or be part of the computer system.

It is to be appreciated that the use of the common I/O bus 112 is for ease of explanation in the diagram only and that a number of alternative means of routing input and output signals may be beneficially employed. For example, audio output signals to the speakers could be routed through amplifiers and with an appropriate number of independent audio "patch" cables, video signals may be routed with an independent coaxial cable, and control signals may be routed along a two-wire serial line or through infrared (IR) communication signals or radio frequency (RF) communication signals.

The wireless I/O control device 110 may be a remote control unit which communicates with controller 102 of review apparatus 100 through IR signals. Alternatively, wireless I/O control device 110 may be a wireless keyboard and cursor positioning device that communicates with the components of review apparatus 100 through IR signals or RF signals. In another alternative, wireless I/O control device 110 may be an I/R remote control device similar in appearance to a typical remote control with the added feature of a track-ball, which allows a user to position a cursor on a display device 104 of review apparatus 100. The display device 104, in one embodiment, can be either a television or a monitor. Memory 108 can be any conventional memory device known in the art.

It is also to be appreciated that the several apparatus components depicted in FIG. 1 can be beneficially combined. By way of example, controller 102 could be integrated into display device 104 or DVD player 106 to accomplish the present invention. Alternatively, controller 102 and memory 108 may reside internally in the housing for the DVD player 106 and indeed, may form part of the internal controller which controls operation of DVD player 106. Controller 102 may be also be configured to be a "set-top" box controller.

Figure 2:
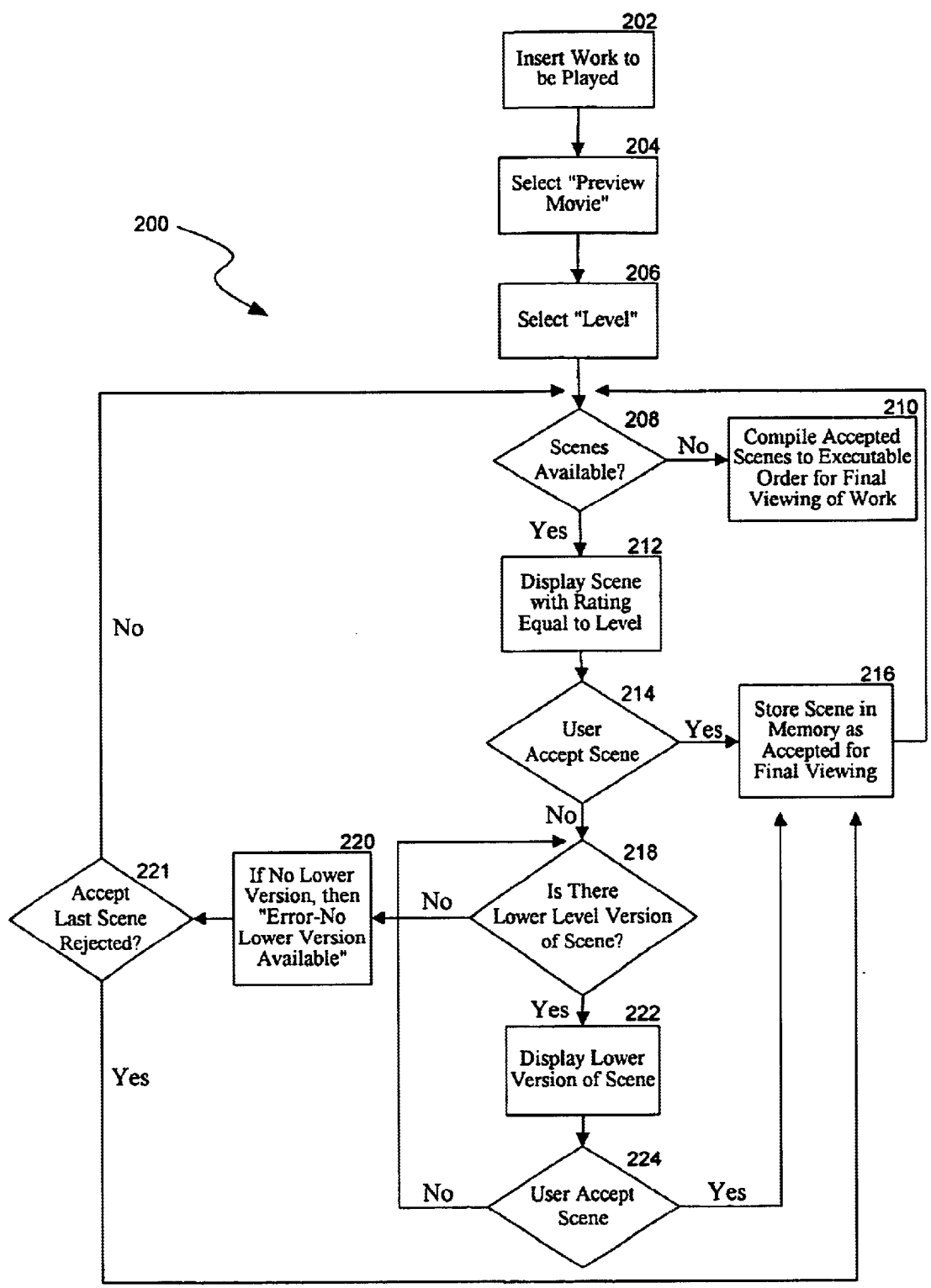
FIG. 2 illustrates a flowchart of the method of a first embodiment of the present invention.

FIG. 2 illustrates in flowchart form the processing sequence which occurs in accordance with a first embodiment of the present invention. In block 202, the user inserts a work, e.g. DVD disc, to be played into a media player, such as a DVD player 106 which also initiates controller 102, via I/O bus 112. The controller 102 automatically communicates with display device 104 to display a menu screen containing various options including an option to "preview a movie". The user will select "preview a movie" at block 204 through the use of, for example, wireless I/O device 110 which communicates with controller 102 which then communicates with display device 104 to display a series of levels for personal viewing. Using the ratings system described above, the levels would be G, PG, PG-13, R and NC-17. Next, the user, in block 206, selects a particular "level," which equates to a particular rating, with the use of wireless I/O device 110. This information is then received by the controller 102 is and communicated to DVD player 106 for further processing. DVD player 106 searches the work for any scenes that have a rating level equal to that selected by the user in block 206. If a scene is found in block 208 that has a rating level equal to that chosen in block 206, the scene is displayed for the user in block 212 for user acceptance or rejection in block 214. The acceptance or rejection of a particular scene is input by a user utilizing wireless I/O device 110 and received by controller 102. In block 216, controller 102 will assign pointers or identifiers to each of the video frames, which make up a scene, which the user has accepted and create a database of pointers in memory 108. At this point, the process segments of blocks 208, 212, 214 and 216 are repeated for all additional scenes which meet the selected rating entered at Step 206. Until, at block 208, there are no more scenes available with a rating level equal to that selected at block 206. The database of pointers that was stored in block 216 is now compiled into an executable order by controller 102 which instructs the DVD player to play only those accepted scenes along with all other scenes that have a rating level less than that chosen in block 206. Playback of the work by the DVD player may now occur.

If the user rejects a scene at 214, controller 102 will communicate with DVD player 106 and direct it to search for a lower level version of the rejected scene at block 218. If there are no lower versions of the rejected scene available, then controller 102 communicates via I/O bus 112 to display device 104 to display "Error-No Lower Level Version Available" as in block 220. The user will then be prompted by a display message in block 221, to either accept or reject again the last scene that was rejected in block 214 (rejected scene). If accepted, the pointers to the accepted scenes are stored in the memory 108 in block 216 for later viewing. However, if the accepted previously rejected scene is again rejected, then controller 102 will default back to block 208.

If however, a lower version of the scene (alternative scene) is available at block 218, then DVD player 106 plays the scene through display device 104 and is viewed by user at block 222. The user is then again prompted to accept or reject the lower version of the scene. If the user accepts the lower version of the scene (block 224) by use of the wireless I/O device 110, then controller 102 will assign pointers to the video frames which make up the scene and stores it in memory 108 to create a database of pointers for compilation by controller 102 in block 210 for later viewing. If the user does not accept the alternative scene at block 224, then the controller 102 will repeat the process segments of 218, 222 and 224 until there are no more available versions of a selected scene and then default back to block 208 if the last rejected scene in block 214 is not accepted for viewing in block 221.

Figure 3:
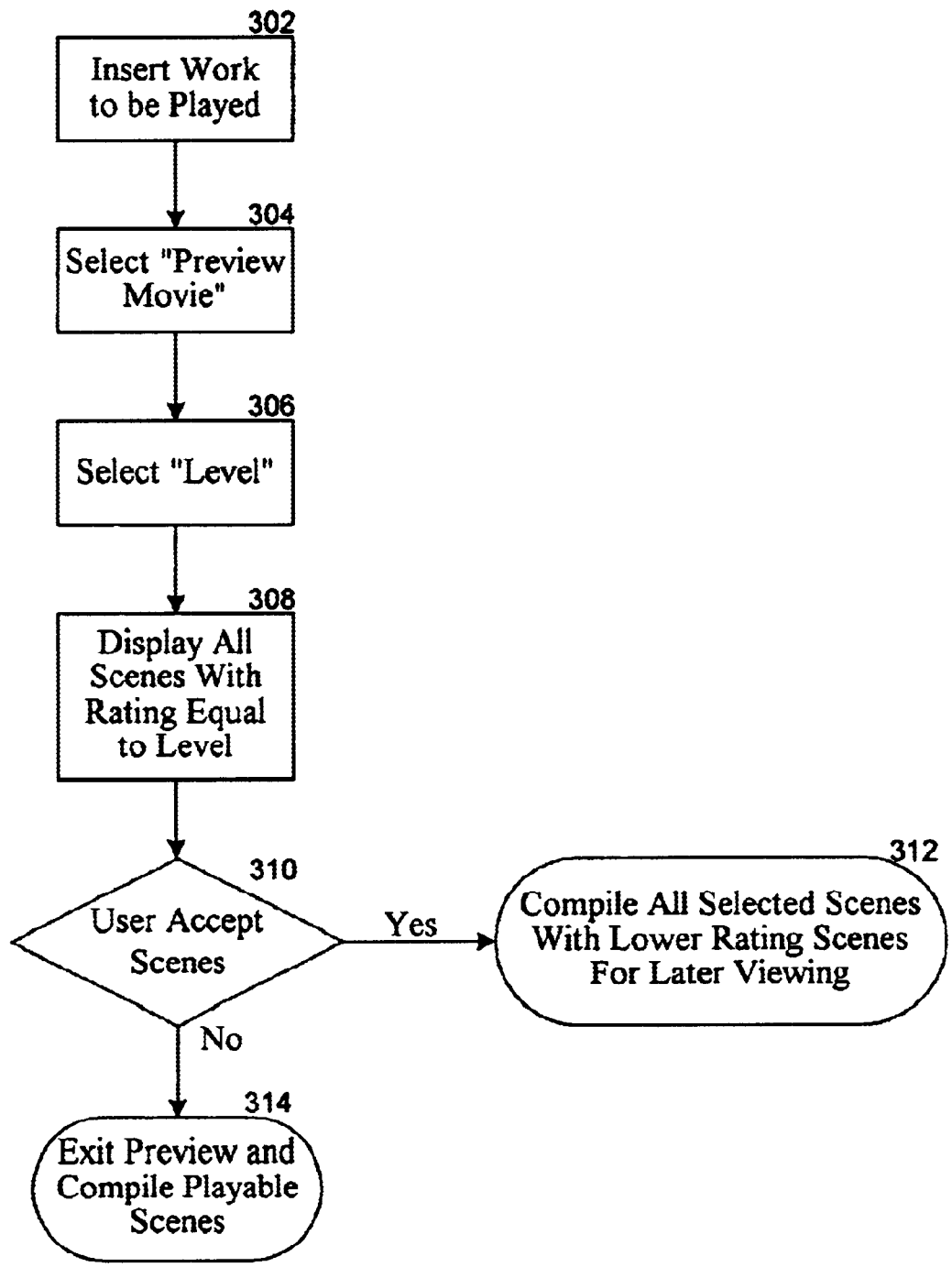
FIG. 3 illustrates a flowchart of the method of a second embodiment of the present invention.

FIG. 3 illustrates in flowchart form the processing flow segments of the second embodiment of the present invention. In block 302, the user inserts a work, e.g. DVD disc, to be played into a media player, such as a DVD player 106 and initiates controller 102 via I/O bus 112. The controller 102 automatically communicates with display device 104 to display a menu screen containing various options including an option to "preview a movie". The user will select "preview a movie" at block 304 through the use of, for example, wireless I/O device 110 which communicates with controller 102 which then communicates with display device 104 to display a series of rating levels for personal viewing. Next, the user, in block 306, selects a particular "level," which equates to a particular rating, e.g. PG-13, with the use of wireless I/O device 110. This information is then received by the controller 102 and communicated to DVD player 106. DVD player 106 then plays the video frames, comprising a scene or scenes, which have a rating equal to the level chosen by the user in block 306. The DVD player 106 plays only those scenes. The user will review the scenes (block 308) and the controller 102 will receive the input through wireless I/O device 110 from user as to accept or reject all the scenes together. Here, all the scenes are selected for final viewing collectively by the user in block 310. Hence, this embodiment does not allow particular scenes to be accepted or rejected individually. The user must decide whether to accept or reject all the scenes together. In the event that the user accepts all the scenes, in block 310, the controller 102 directs the DVD player to combine all the scenes that have a rating less than that chosen by user in block 306 and all the scenes equal to the rating or level chosen by user at block 306 for seamless later viewing in block 312. But, if the user does not accept all the scenes for final viewing in block 310, then the controller 102 will exit the preview mode in block 314.

Figure 4:
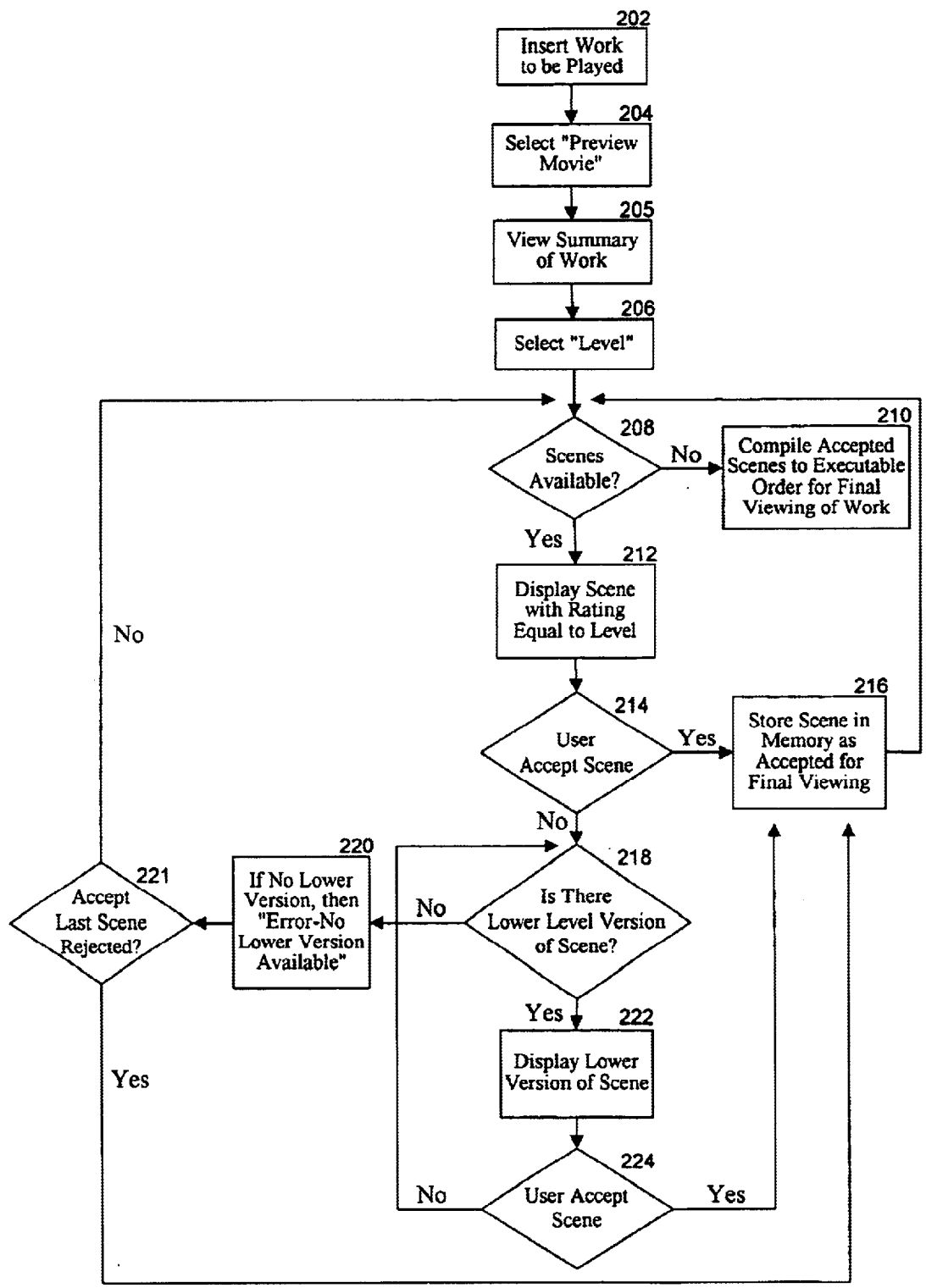
FIG. 4 illustrates a flowchart of the method of a third embodiment of the present invention.

FIG. 4 illustrates in flowchart form the processing sequence of a third embodiment of the present invention. Here, the user will perform all the process segments, namely, blocks 202–224 entirely as performed for the process segments of the first embodiment of the present invention in FIG. 2. However, in this embodiment, the user may view a video summary of the entirety of the work in block 205 prior to selecting a "level" in block 206. The summary of the work would be included on the work. This embodiment allows a user, previewing the work, to be able to understand the context of the scenes to be selectively previewed.

Figure 5:
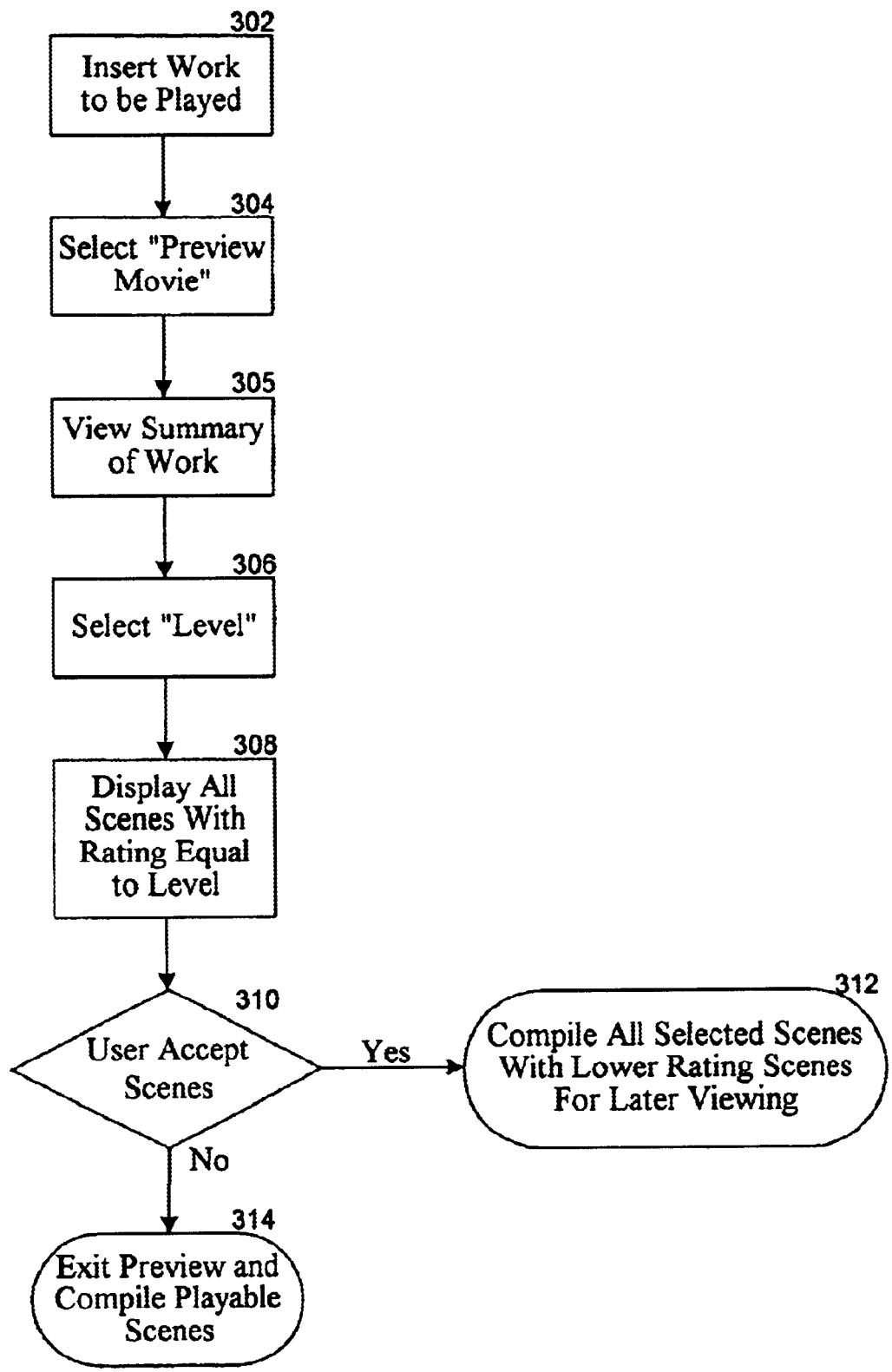
FIG. 5 illustrates a flowchart of the method of a fourth embodiment of the present invention.

FIG. 5 illustrates in flowchart form the processing sequence of a fourth embodiment of the present invention. Here, the user will perform all the process segments, namely, blocks 302–314 entirely as performed for the process segments of the second embodiment of the present invention in FIG. 3. However, in this embodiment, the user may view a video summary of the entirety of the work in block 305 prior to selecting a "level" in block 306. The summary of the work would be included with the media as it is inserted to be played in block 302. This embodiment allows a user, previewing the work, to be able to understand the context of the scenes to be selectively previewed.

While exemplary embodiments of the invention have been described and illustrated above, the invention is not limited to these specific embodiments as numerous modifications, changes and substitutions of equivalent elements can be made without departing from the spirit and scope of the invention. Accordingly, the scope of the present invention is not to be considered as limited by the specifics of the particular structures which have been described and illustrated, but is only limited by the scope of the appended claims.

What is claimed as new and desired to be protected by Letters Patent of the United States is:

1. A method for controlling reproduction of a displayable work stored on a recording medium, said work having at least one pre-assigned ratings level associated with at least one scene, said method comprising the acts of:

receiving a ratings level input;

selecting all scenes of said work which have a pre-assigned ratings level equal to the received ratings level input;

displaying only said selected scenes; and receiving a first input command accepting or rejecting selected and displayed scenes for later viewing.

2. The method of claim 1 further comprising storing information indicating those scenes which have been accepted for later viewing.

3. The method of claim 1 wherein said selected and displayed scenes are each accepted or rejected individually.

4. The method of claim 3 further comprising displaying an alternative scene from said work which has a second rating less than that of a displayed scene, for each displayed scene which is rejected.

5. The method of claim 4 further comprising receiving a second input command accepting or rejecting said alternative scene for later viewing.

6. The method of claim 5 further comprising storing information indicating those alternative scenes which have been accepted for later viewing.

7. The method of claim 5 further comprising reproducing and displaying those scenes of said work which have a ratings level which is lower than that of said ratings level input along with those scenes which have been accepted.

8. The method of claim 4 further comprising receiving a third input command accepting or rejecting a last rejected scene by said first input command if no alternative scene is available for said last rejected scene.

9. The method of claim 8 further comprising storing information indicating those last rejected scenes which have been accepted for later viewing.

10. The method of claim 8 further comprising reproducing and displaying those scenes of said work which have a ratings level which is lower than that of said ratings level input along with those scenes which have been accepted.

11. The method of claim 1 wherein said selected and displayed scenes are all accepted or rejected collectively.

12. The method of claim 1 further comprising reproducing and displaying those scenes of said work which have a ratings level which is lower than that of said ratings level input along with those scenes which have been accepted.

13. The method of claim 1 further comprising displaying a summary of said work prior to receiving said ratings level input.

14. An apparatus for controlling reproduction of a displayable work stored on a recording medium, said work having at least one pre-assigned ratings level associated with at least one scene, said apparatus comprising:

a reproduction device for selectively reproducing scenes from a recording medium;

a display device coupled to said reproduction device for displaying said selectively reproduced scenes; and a controller responsive to entry of a first ratings level for controlling said reproduction device to cause the selective reproduction and display only of scenes from a recording medium having said entered ratings level and for recording an entered accept or reject command associated with the displayed scenes.

15. The apparatus of claim 14 further comprising a memory for storing information indicating those scenes which have been accepted for later viewing.

16. The apparatus of claim 15 wherein said controller records an entered accept or reject command for each of said selected and displayed scenes individually.

17. The apparatus of claim 16 wherein said controller causes said reproduction device to play and said display device to display an alternative scene from said work which has a second rating less than that of a displayed scene, for each displayed scene which is rejected.

18. The apparatus of claim 17 wherein said controller receives a second input command accepting or rejecting said alternative scene for later viewing.

19. The apparatus of claim 18 wherein said memory stores information indicating those alternative scenes which have been accepted for later viewing.

20. The apparatus of claim 18 wherein said reproduction device and said display device reproduces and displays those scenes of said work which have a ratings level which is lower than that of said ratings level input along with those scenes which have been accepted.

21. The apparatus of claim 15 wherein said controller records an entered accept or reject command for all of said selected and displayed scenes collectively.

22. The apparatus of claim 15 wherein said controller receives a third input command accepting or rejecting a last rejected scene by said first input command for later viewing.

23. The apparatus of claim 22 wherein said memory stores information indicating those rejected scenes which have been accepted for later viewing.

24. The apparatus of claim 22 wherein said reproduction device and said display device reproduces and displays those scenes of said work which have a ratings level which is lower than that of said ratings level input along with those scenes which have been accepted.

25. The apparatus of claim 14 wherein said reproduction device and said display device reproduces and displays those scenes of said work which have a ratings level which is lower than that of said ratings level input along with those scenes which have been accepted.

26. The apparatus of claim 14 further comprising displaying a summary of said work prior to said controller receiving an entered ratings level.

27. The apparatus of claim 14 further comprising an input device for entering a first ratings level and for entering an accept or reject command.

28. A method for controlling reproduction of a displayable work stored on a recording medium, the work having a first scene, a second scene, and a third scene, a first pre-assigned ratings level being associated with the first and third scenes and a second pre-assigned ratings level being associated with the second scene, the first pre-assigned ratings level being higher than the second pre-assigned ratings level:

conducting a preview by:
receiving a ratings level input from a user, wherein the ratings level input corresponds to the first pre-assigned ratings level;
selecting the first and third scenes of the work;
displaying the first scene and the third scene without displaying the second scene; and
receiving at least one input command accepting or rejecting the first and third scenes for later viewing; and reproducing and displaying at least a portion of the work by:
reproducing and displaying the first scene only if the first scene was accepted in the preview;
thereafter, reproducing and displaying the second scene; and
thereafter, reproducing and displaying the third scene only if the third scene was accepted in the preview.

29. The method of claim 28 further comprising storing information indicating those scenes which have been accepted for later viewing.

30. The method of claim 28 wherein said first and third scenes are each accepted or rejected individually.

31. The method of claim 30 further comprising displaying an alternative scene from said work which has a third pre-assigned ratings level that is less than the first pre-assigned ratings level, for each of the first and third scenes which is rejected.

32. The method of claim 31 wherein the at least one input command is a first input command further comprising receiving a second input command accepting or rejecting said alternative scene for later viewing.

33. The method of claim 32 further comprising storing information indicating those alternative scenes which have been accepted for later viewing.

34. The method of claim 32 further comprising receiving a fourth input command accepting or rejecting a last rejected scene if no alternative scene is available for said last rejected scene.

35. The method of claim 34 further comprising storing information indicating those last rejected scenes which have been accepted for later viewing.

36. The method of claim 28 wherein said first and third scenes are accepted or rejected collectively.

37. The method of claim 28 further comprising displaying a summary of said work prior to displaying the first scene when conducting the preview.

* * * * *